United States Patent [19]

Heyman

[11] 4,172,311
[45] Oct. 30, 1979

[54] PROCESS FOR MANUFACTURING SOLAR COLLECTOR PANELS

[75] Inventor: Joseph H. Heyman, Ridgefield, Conn.

[73] Assignee: American Solar Heat Corporation, Danbury, Conn.

[21] Appl. No.: 806,728

[22] Filed: Jun. 15, 1977

[51] Int. Cl.$^2$ .................. B23P 15/00; F24J 3/02
[52] U.S. Cl. ............... 29/157.3 R; 29/157.3 C; 126/417; 165/48 S; 165/79; 165/149
[58] Field of Search ............ 29/157.3 C, 157.3 R; 126/271, 270; 165/48, 171, 149, 76, 79

[56] References Cited

U.S. PATENT DOCUMENTS

| | | | |
|---|---|---|---|
| 2,274,492 | 2/1942 | Modine | 126/271 |
| 2,490,659 | 12/1949 | Snyder | 126/271 |
| 2,859,945 | 11/1958 | Kleist | 165/171 |
| 3,262,190 | 7/1966 | Rostoker et al. | 29/157.3 R |
| 3,866,285 | 2/1975 | Clark | 126/271 |
| 3,904,721 | 9/1975 | Puterbaugh | 29/157.3 R |
| 3,954,218 | 5/1976 | van Dijk | 29/157.3 C |
| 4,011,856 | 3/1977 | Gallagher | 126/271 |
| 4,018,211 | 4/1977 | Barr | 126/271 |

*Primary Examiner*—Francis S. Husar
*Assistant Examiner*—Daniel C. Crane
*Attorney, Agent, or Firm*—Mattern, Ware, Davis & Stoltz

[57] ABSTRACT

Lightweight, economical and highly effective solar energy collector panels are formed with a sheet of transparent plastic exposed to solar radiation and spaced by a rigid lightweight spacer frame above a sheet of metallic foil, which embraces in heat conducting relationship a spaced array of metal water-carrying tubes all supported by an underlying plastic foam slab, with the overall assembly being encircled by a channel section peripheral frame.

By completing the panel assembly with foam material which substantially entirely encapsulates the panel components internally in an inexpensive, lightweight, and completely effective framed unit, a unique panel construction is achieved by a unique manufacturing process.

2 Claims, 6 Drawing Figures

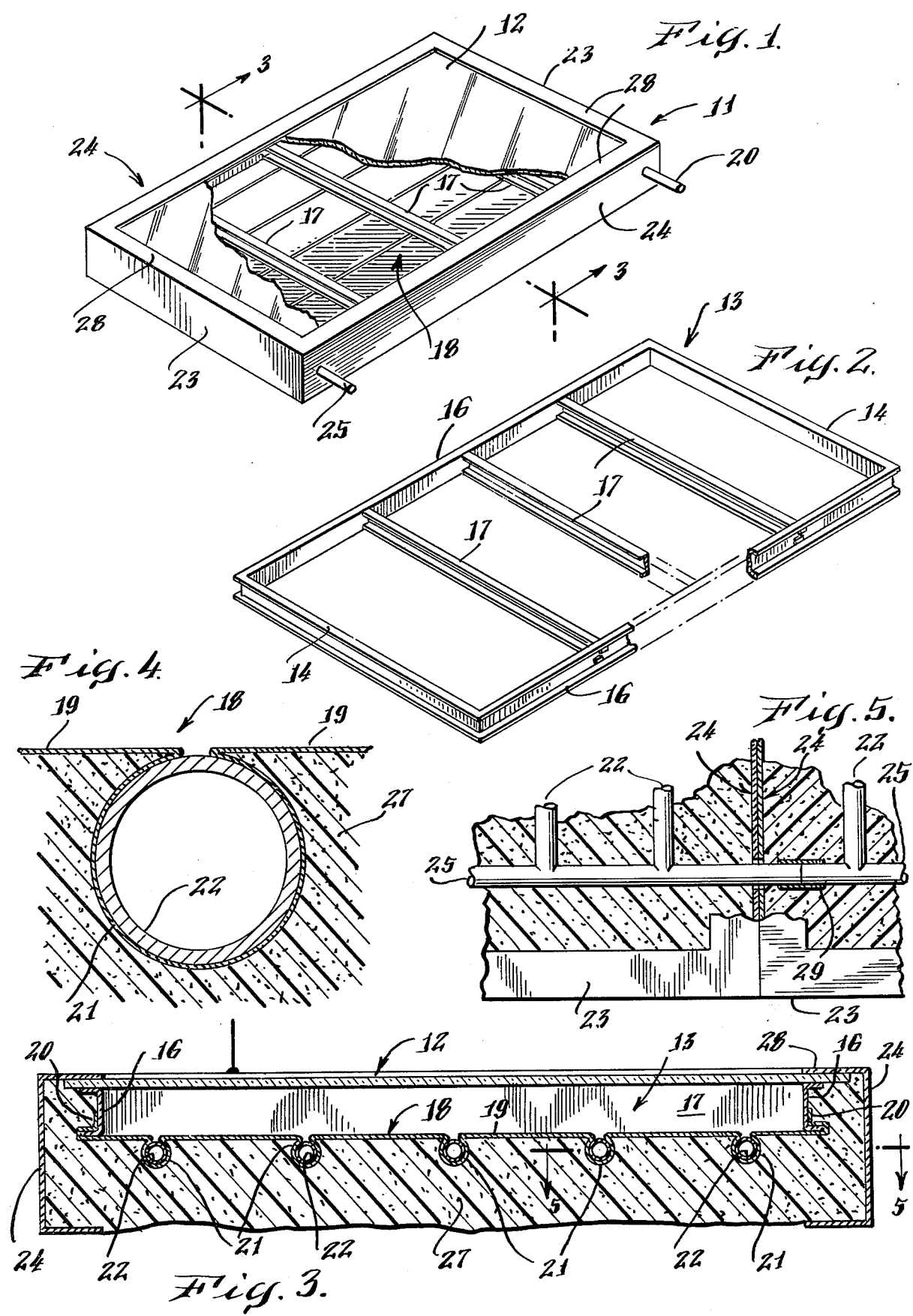

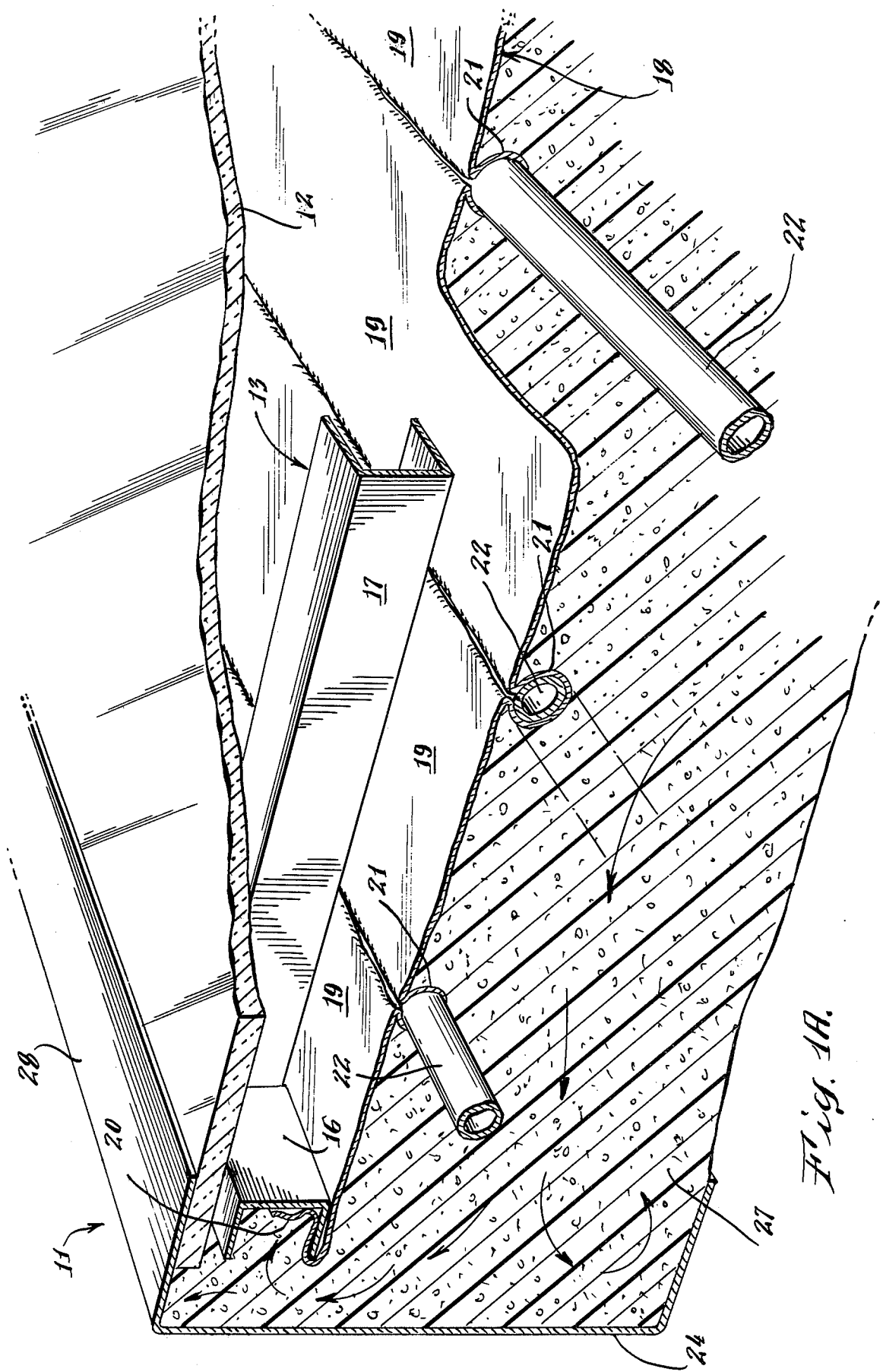

PROCESS FOR MANUFACTURING SOLAR COLLECTOR PANELS

This invention relates to solar energy collector panels and particularly to highly effective, lightweight and economical solar panels designed to avoid the substantial expense and manufacturing complexities of conventional collector panels.

BACKGROUND OF THE INVENTION

Collector panels designed for solar energy heating systems in conventional installations traditionally require heavy facing panes of glass, preferably safety glass to resist the impact of hailstones and to carry snow and ice loads, combined with sheet metal structural enclosures forming flat boxes designed to be mounted on slanted roof tops or supported on slanted frames exposed to solar radiation. Major glass manufacturers have offered these conventional solar panels for sale at prices which have been high enough to place solar energy heating systems beyond the reach of a large proportion of the population.

GENERAL DESCRIPTION OF THE INVENTION

The solar energy collector panels of the present invention avoid the cumbersome heavy weight and substantial expense of such conventional collector panels by utilizing a transparent facing sheet of glass fiber-reinforced resin material overlying a shallow air space above a sheet of metallic foil collector material closely embracing a spaced underlying array of water-carrying tubes, all supported by a plastic foam base, which ruggedly locks all components of the device together to form a unitary lightweight panel. The shallow air space is maintained by a lightweight ladder-shaped frame of light metal such as aluminum, and the entire assembly is secured inside a substantially rigid structural frame enclosure, preferably formed of mitered channel-shaped aluminum members. The use of extremely thin lightweight metal and metallic foil coupled with the light weight of the glass fiber-reinforced resin facing sheet material and the lightweight plastic foam base produces an unusually lightweight and inexpensive collector panel assembly. The plastic foam base is foamed in place, spreading across the panel width to embrace the ends and sides of internal components, and simultaneously expanding in depth to fill the interior space between the flanges of the outer channel frame, to form a sturdy panel unit. The lightweight resilient foam base thus forms an intimately interlocked part of a novel, unitary structure, and the various components are thereby locked together in novel synergism to produce surprisingly economical solar collector panels.

Gallagher U.S. Pat. No. 4,011,856 employs plastic tubes embraced in channels joining metal panels screwed to wood braces encased in insulating material (sawdust, fiberglass or plastic foam) behind two sheets of tempered glass.

Dow Corning U.S. Pat. No. 3,866,285 issued to Harold A. Clark on Feb. 18, 1975 proposes a solar collector panel incorporating a slab of phenolic, polyester or polyurethane foam provided with a series of parallel upward facing concave grooves and surmounted by a pair of thin glass panels 21 and 22 with a dual-layer glass panel resting on and supported by the ridges between the parallel grooves.

These heavy double-pane glass structures typify the costly prior art panels, and contra-indicate the lightweight interlocked structural integrity of the panels of this invention.

In the present invention, the formation of parallel concave grooves and the support of a pair of relatively heavy glass panels is avoided, and the overlying sheet of weather-protective glass fiber reinforced resin is amply supported by an extremely lightweight thin sheet metal frame resting directly on the substantially flat metallic foil collector material. Fabrication is facilitated with unique economy, and all risks of cracked or shattered glass facing materials are totally eliminated.

Accordingly, a principal object of the invention is to provide solar energy collector panels which are economical to fabricate and highly convenient to store, ship and install because of their unusually light weight and sturdy construction.

A further object of the invention is to provide solar energy collector panels of this character incorporating glass fiber-reinforced resin facing sheet material spaced above thin metallic foil collector assemblies supported by a plastic foam slab base.

Another object of the invention is to provide such solar energy collector panels incorporating a lightweight metal spacing frame interposed between the metallic foil collector material and the overlying plastic sheet facing panel.

Still another object of the invention is to provide such solar energy collector panels peripherally encased in a sturdy channel-section housing frame.

Still another object of the invention is to provide methods of fabricating inexpensive and lightweight solar energy collector panels in which a preassembled array of water-conducting tubes embraced by a metallic foil heat collector material are embedded in lightweight plastic foam in situ.

A still further object of the invention is to provide fabrication methods and assembly techniques for producing solar energy collector panels of the above character with minimum cost and labor.

Other objects of the invention will in part be obvious and will in part appear hereinafter.

The invention accordingly comprises the features of construction, combinations of elements and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings.

THE DRAWINGS

FIG. 1 is a perspective view, partially broken away, of a preferred embodiment of the solar energy collector panels of the present invention;

FIG. 1A is a greatly enlarged fragmentary perspective, broken away in cross-section, showing the synergistic cooperation of the structural component parts integrally interlocked in a solar panel of this invention.

FIG. 2 is a perspective view, partially broken away, of a lightweight sheet metal spacer frame assembly incorporated in the collector panel of FIG. 1;

FIG. 3 is a cross-sectional elevation view of the solar energy collector panel of FIG. 1 taken along the line 3—3 shown in FIG. 1;

FIG. 4 is a greatly enlarged fragmentary cross-sectional elevation view of one of the metal water-carrying tubes of the same collector panel assembly shown closely embraced in a metallic foil collector sheet material and embedded in the surrounding foamed plastic slab base; and FIG. 5 is a fragmentary cross-sectional plan view, taken along the section 5—5 in FIG. 4, of two adjacent panels showing the internal conduit construction and conduit connections between panels.

SPECIFIC DESCRIPTION OF THE INVENTION

A solar energy collector panel 11 of the present invention is shown in FIGS. 1, 1A and 3, and is characterized by an upper transparent flat sheet or panel 12 of glass fiber-reinforced resin material formed in an elongated rectangle. Panel 12 directly overlies a rectangular spacer frame 13 formed of thin sheet or extruded aluminum, preferably having a C-shaped or channel-shaped cross-section, and comprising shorter top and bottom members 14 having their ends mitred to engage the similarly mitered ends of elongated side members 16 which together form a mitered rectangular outer frame spanned by cross-members 17, extending across the frame 13 from one side member 16 to the other side member 16 at spaced intervals, and all being substantially parallel with the top and bottom members 14. All of the members 14, 16 and 17 are preferably formed of the same thin aluminum channel material slotted and staked or otherwise inexpensively secured together without diagonal stiffening or reinforcing. Diagonal bracing and ridigifying are not required for the spacer frame 13, since its principal function is the support and spacing of the fiberglass panel 12 above the sturdy underlying parts of the assembly.

These underlying parts comprise a thin sheet of metallic foil such as aluminum foil 18 arrayed in a series of coplanar segments 19 lying closely adjacent and joined along their reversely folded adjacent edges by continuous "cylindrical" foil segments 21 each forming a nearly closed tube closely embracing a water-carrying tube 22 formed of copper or similar metal of high heat conductivity, connected by end manifold tubes 25.

The outermost edges of the continuous foil sheet 18 from which the segments 19 and 21 are formed may be turned up and reversely folded at 20, crimpingly embracing the outermost edges of the side members 16 of frame 13, as shown in FIGS. 1A and 3, and the entire assembly is of glass fiber-reinforced transparent sheet 12, frame 13 and foil sheet 18 assembled with the water-carrying tubes 22 are peripherally encircled by the channel-shaped end members 23 and side members 24 of a mitered rectangular outer frame 26. The end members 23 and side members 24 are preferably formed of channel-shaped aluminum or aluminum extrusions and their corners may be mitered and welded or overlapped and riveted or secured in similar ways.

As shown in FIG. 3, the interior of the outer frame 26 is filled with plastic foam backing 27 embeddingly embracing the tubes 22 enclosed inside the cylindrical segments 21 of foil sheet 18. The outermost portions of the plastic foam back 27 extended upward around the side members 16 of frame 13 and substantially fill the space between side members 24 of outer frame 26, as shown in FIGS. 1A and 3, leaving unfilled only the air space within the separate rectangular openings of the spacer frame 13 embraced between segments 19 of the foil sheet 18 and the glass fiber-reinforced resin sheet 12.

FABRICATION METHOD

The preferred procedure for fabricating the solar energy collector panels of this invention in inverted orientation comprises the following steps, and may be visualized by viewing FIG. 1A upside down. First, the outer frame 26 is assembled and placed face down on an assembly work table. The transparent fiberglass sheet 12 is laid inside outer frame 26 with its outermost edge faces juxtaposed to the interior surface of the upper flange 28 of the C-shaped or channel-shaped end and side members 23 and 24 forming outer frame 26. The assembled ladder-shaped spacer frame 13 is next laid on the exposed under surface of fiberglass sheet 12.

The spaced arrayed aluminum or copper tubes 22 are held in a suitable jig and are connected by suitably brazed or soldered manifold end tubes 25, and the fresh flat foil sheet 18 is successively crimped in turn around each of the tubes 22, thus forming the cylindrical embracing foil segments 21 contiguously joined to and spaced apart by the flat coplanar segments 19.

The assembly of spaced tubes 22 with their connecting end tubes 25 and the embracing foil sheet 18 is then moved into position juxtaposed to the spacer frame 13 with the coplanar panels 19 of the foil sheet 18 being placed directly upon the exposed under surfaces of spacer frame 13. If desired, as indicated in FIG. 1, the ends of tubes 25 may protrude through suitable apertures in side members 24 of outer frame 26, for connection to tubes 25 of the adjacent panel unit by watertight sleeve gaskets 29, as shown in FIG. 5. The outermost edges of the foil sheet 18 extending beyond spacer frame 13 are then folded and reversely crimpfitted at 20 to embrace the outermost channel members 16 of spacer frame 13, all as shown in FIGS. 1A and 3, where the normal radiation-exposed operating position of the solar energy collector panel 11, facing upward toward the sunlight, is illustrated.

The assembly of panel 11 is performed in inverted position, as the foregoing description makes evident, which parts 12, 13 and 18–22 being placed successively in position inside the outer frame 26. After these parts are placed in assembled relationship, the foamed-in-place plastic material is introduced and foamed within the remaining volume embraced by inverted outer frame 26, forming the plastic foam back 27 as shown in FIGS. 1A and 3, and firmly anchoring all assembled components within the outer frame 26 to form a rugged integrated panel.

The face of metallic foil sheet 18 exposed to solar radiation directly beneath fiberglass panel 12 is preferably provided with a black anodized coating or a coating of black paint, lacquer or similar material, enhancing its black body radiation absorption characteristics and minimizing back-reflection of radiation impinging on metallic foil sheet 18.

Upon curing of the plastic foam back 27 inside the outer frame 26, the assembly of the solar energy collector panel of the present invention is complete, with the foam back 27 holding the previously assembled component parts firmly and sturdily in position behind the upper flange 28 of the channel-shaped members 23 and 24 of frame 26, as shown in FIG. 3. If desired, cement or bonding agents compatible with the fiberglass panel 12 and the plastic foam material 27 may be employed, particularly between panel 12 and outer frame 26 and between panel 12 and spacer frame 13 to insure the water-tight integrity of the weather-exposed uppermost surfaces of the panel assembly 11. After completion, any desired number of panels 11 may be assembled side by side with their respective protruding end tubes 25 being suitably joined in water-conducting relationship, permitting an array of two, three or more panels to be positioned side by side and supported by a sloping roof surface exposed to solar radiation, or mounted on suitable framing to position the panels 11 at an angle complementary to the average winter altitude angle of the sun above the horizon during the months of principal heating demand.

It will be readily apparent that the lightweight metal structures of frames 13 and 26 and the tubes 22 and 25 incorporated in the assemblies of panel 11, coupled with the extremely light weight of foil 18, fiberglass panel 12 and plastic foam back 27, all cooperate to assure that the panel assemblies 11 of this invention are extremely light in weight and economical in fabrication. Sturdy resiliency contributed by the plastic foam back 27 firmly anchors the other components in position in synergistic fashion, and assures dimensional and shape stability of the completed panels. The aluminum outer frame 26 and the plastic materials incorporated in panels 11 provide excellent long-lived weathering characteristics, providing extended useful life.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A method for fabricating a lightweight economical solar energy collector panel comprising the steps of:
   A. inverting at a work station an outer frame having an inwardly protruding top flange defining a radiation-receiving opening, thereby upwardly exposing the underside of the top flange;
   B. positioning on the upwardly exposed underside of the top flange a translucent layer substantially transparent to solar radiation spanning the outer frame across the opening beneath the top flange;
   C. placing on the upwardly exposed underside of the translucent layer a spacer partition means underlying the translucent layer, and having a plurality of rigid upright support wall portions spanning the outer frame and juxtaposed to the translucent layer;
   D. forming a manifold-connected plurality of heat-conductive fluid conduit means shaped and dimensioned for underlying the spacer partition means;
   E. forming a temporary array comprising a thin metallic foil sheet foldably formed into cylindrical channel heat-transmitting portions which all closely embrace the fluid conduit means, and which are contiguously foldably joined by substantially flat heat-receiving portions shaped for extending across the opening beneath the spacer partition, exposed to solar radiation entering the opening;
   F. inverting and positioning the temporarily assembled metallic foil sheet and conduit array on the exposed underside of the upright support wall portions of the spacer partition means with the conduit array protruding into the interior region of the outer frame away from the spacer partition means; and
   G. foaming in place a polymer foam back directly in contact with the temporarily assembled metallic foil sheet and fluid conduit array, spanning and substantially filling the remaining space within the outer frame and thereby permanently anchoring the foregoing assembled components into a sturdily interconnected panel unit.

2. The solar energy collector panel fabrication method defined in claim 1, wherein the polymer foam back is foamed in situ while the panel assembly is inverted whereby the polymer foam spreads laterally and longitudinally under the metallic sheet to fill the width and length of the outer frame, and spreads depthwise around the spacer partition under the top flange of the outer frame, solidifying to rigidify the panel assembly in a solidly anchored integral panel unit.

* * * * *